United States Patent Office 3,533,975
Patented Oct. 13, 1970

3,533,975
STABILIZED VINYL HALIDE RESIN COMPOSITIONS
James P. Scullin, Pompton Lakes, N.J., assignor to Tenneco Chemicals, Inc., a corporation of Delaware
No Drawing. Filed Sept. 28, 1966, Ser. No. 582,488
Int. Cl. C08f 45/58, 45/62
U.S. Cl. 260—23
20 Claims

ABSTRACT OF THE DISCLOSURE

Vinyl halide resin compositions that have excellent heat and light stability, color, and clarity and little tendency to plate-out are prepared by incorporating in the resin a stabilizer that comprises (a) a liquid, oil-soluble barium salt complex, (b) a polyvalent metal benzoate, (c) an alkyl aryl phosphite, and (d) a phenolic compound.

---

This invention relates to stabilizers for halogen-containing resins and to the resinous compositions stabilized therewith. More particularly, it relates to vinyl halide resin compositions that contain a heat and light stabilizer that comprises a liquid oil-soluble barium salt complex, a polyvalent metal benzoate component, an alkyl aryl phosphite, and a phenolic compound and that are characterized by excellent heat and light stability, resistance to plate-out, color, and clarity.

A rapidly expanding industry utilizing vinyl halide resins has created a need for stabilizers that will render the finished articles of manufacture more useful, more versatile in application, and more nearly permanent. During their fabrication into plastic sheets, rigid bodies, and the like, for example, vinyl halide resins are ordinarily subjected to elevated temperatures. The resins so treated tend to decompose somewhat as is evidenced by their development of color. This decomposition is especially pronounced when scrap portions of the resins are reprocessed in apparatus operated at elevated temperatures. Even though the decomposition on heating may not detract to any appreciable extent from the physical properties of the resins, the discoloration seriously restricts their use in many applications. There has therefore arisen a need for stabilized vinyl halide resin compositions that can withstand without darkening or otherwise deteriorating the heating to which they may be subjected during processing as well as the subsequent prolonged heating of the finished products.

In addition to having good heat stability, it is necessary that vinyl halide resins show little or no tendency to plate-out during processing. Plate-out is the result of the separation of one or more ingredients, usually pigments and stabilizers, from a vinyl halide resin composition during the various stages of its processing and the deposition of these materials onto the metal surfaces of the processing equipment. These deposits on the metal surfaces may cause streaking or spotting of the finished products. They may also interfere with sheet transfer from roll to roll or with the removal of the product from the mold, thereby reducing the rate of production. To be useful commercially, the compositions should also have good color, clarity, and light stability.

A number of compounds and combinations of compounds have been suggested for use as stabilizers in vinyl halide resins. While some of these impart heat stability to the resins and others reduce their tendency to plate-out, none have previously been disclosed that will impart to the resinous composition the desired combination of heat and light stability, clarity, resistance to plate-out, and other valuable properties.

It is therefore an object of the present invention to provide stabilizers which when added to a halogen-containing resin will protect the resin from thermal degradation for a prolonged period of time. It is a further object to provide halogen-containing resin compositions that are stabilized against the deteriorative effects of heat and light. It is still another object of the invention to provide vinyl halide resin compositions that have little tendency to plate-out during processing. It is also the object of this invention to provide vinyl halide resin compositions that are characterized by light colors and excellent clarity. Other objects and advantages of the invention will be apparent from the detailed disclosure that follows.

In accordance with the present invention, it has been found that vinyl halide resin compositions have excellent heat and light stability, good color and clarity, little tendency to plate-out, and other valuable properties may be obtained by incorporating in the resin a stabilizer that comprises (a) a liquid oil-soluble barium salt complex, (b) a polyvalent metal benzoate component, (c) an alkyl aryl phosphite component, and (d) a phenolic compound.

Vinyl halide resin compositions that contain this combination of stabilizer components have been found to be far superior in resistance to plate-out and in clarity to comparable compositions that contain an equivalent amount of a barium salt of an aliphatic or aromatic monocarboxylic acid or a barium alkylphenate in place of the liquid oil-soluble barium salt complex and superior in heat stability, clarity, and resistance to plate-out to those that contain the liquid oil-soluble barium salt complex alone or in combination with a cadmium and/or zinc salt of an aliphatic monocarboxylic acid.

The liquid oil-soluble barium salt complexes that are an essential component of the stabilized compositions of this invention are the products obtained by forming a mixture comprising an alcohol, an acidic compound, and a basic barium compound and treating this mixture with an acidic gas, such as carbon dioxide, until the product is substantially neutral. Particularly satisfactory results have been obtained using a reaction mixture that contained approximately 0.5 equivalent to 10 equivalents of an aliphatic alcohol and 1.1 equivalents to 5 equivalents of barium oxide or barium hydroxide per equivalent of acidic compound and maintaining this mixture at a temperature in the range of 100° C. to 200° C. during its neutralization with carbon dioxide.

The acidic compound that is used in this process may be either an aliphatic monocarboxylic acid or an alkylated monophenol. The preferred acidic compounds are fatty acids having from 10 to 18 carbon atoms, such as capric acid, lauric acid, myristic acid, palmitic acid, stearic acid, oleic acid, linoleic acid, linolenic acid, and mixtures thereof and alkylated phenols having from 1 to 4 alkyl groups each of which has from 3 to 18 carbon atoms, such as isopropylphenol, tert. butylphenol, hexylphenol, n-octylphenol, diisobutylphenol, n-decylphenol, tetrapropylphenol, octadecylphenol, and the like. The alcohols that are suitable for use in this process are aliphatic alcohols having from 1 to 12 carbon atoms, such as methanol, propanol, isopropanol, n-butanol, isobutanol, n-hexanol, isooctanol, 2-ethylhexanol, decanol, dodecanol, and the like. Processes for the preparation of the liquid, oil-soluble barium salt complexes are disclosed in detail in the Le Suer patent U.S. 2,968,642, the Mastin patent U.S. 2,971,014, and the Norman et al. patent U.S. 3,147,232.

The polyvalent metal salt component of the stabilizer compositions consists of one or more salts of a polyvalent metals, such as cadmium, zinc, tin, calcium, or zirconium, with benzoic acid or a substituted benzoic acid in which the substituent is a halogen atom or alkyl group containing not more than 8 carbon atoms, such as toluic acids, xylic acids, ethylbenzoic acids, isopropylbenzoic acids, butylbenzoic acids, octylbenzoic acids, chlorobenzoic acids, bromobenzoic acids, and the like. For most purposes, the preferred polyvalent metal salts are the cadmium salts or mixtures of the cadmium and zinc salts of benzoic acid and p-tert, butylbenzoic acid.

The organic phospihtes that may be used include seconrady and tertiary alkyl aryl phosphites. The preferred alkyl aryl phosphites are those in which the alkyl groups are straight-chain or branched-chain groups having from 2 to 18 carbon atoms and preferably 4 to 10 carbon atoms and the aryl groups are phenyl groups or substituted phenyl groups in which the substituents are hydroxyl groups, halogen atoms, or alkyl groups having from 1 to 12 carbon atoms. Illustrative of these phosphites are the following: diphenyl butyl phosphite, diphenyl octyl phosphite, diphenyl decyl phosphite, phenyl dibutyl phosphite, phenyl di-2-ethylbutyl phosphite, phenyl dioctyl phosphite, di-p-tert. octylphenyl 2-ethylhexyl phosphite, di-(nonylphenyl) 2-chloroethyl phosphite, chlorophenyl di-($\beta$-chloropropyl) phosphite, phenyl hexyl phosphite, chlorophenyl n-decyl phosphite, p-tert. butylphenyl butyl phosphite, phenyl n-decyl phosphite, and the like.

While either a tertiary phosphite or a secondary phosphite may serve as the sole phosphite component of the novel stabilizers, it is generally preferred to use a mixture containing approximately 2 to 10 parts by weight of one or more tertiary phosphites per part by weight of one or more secondary phosphites.

The phenolic compounds that may be used in the novel stabilizers are substituted monohydric and polyhydric phenols in which the substituuents may be halogen atoms, alkyl groups, aryl groups, nitro groups, amino groups, carboxyl groups, or the like. A preferred group of monohydric phenols are alkylphenols that have as substituents 1 to 3 alkyl groups, each of which has from 1 to 8 carbon atoms. Illustrative of these compounds are cresols, xylenols, carvacrol, thymol, butylphenols, octylphenols, chlorophenols, bromocresols, p-hydroxybenzoic acid and its lower alkyl esters, salicylic acid and its lower alkyl and aryl esters, and alkylphenylphenols.

The useful polyhydric phenols include both polynuclear phenols and those phenols that have two or more hydroxyl groups attached to a single aromatic nucleus. A preferred group of plyhydric phenols are the bisphenols having the formula

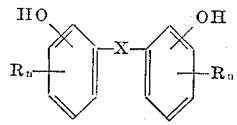

wherein X represents an alkyl or alkylidene group having from 1 to 8 carbon atoms or sulfur, each R represents a lower alkyl group or halogen, and $n$ represents an integer in the range of zero to three. Examples of these compounds include resorcinol, alkylresorcinols, catechol, alkylcatechols, hydroquinone, orcinol, hydroxyhydroquinone, hexahydrobenzene, 2,2-bis (4 - hydroxyphenyl) propane, 2,2 - bis ( 4 - hydroxy) butane, 4,4'-dihydroxybispsenol, 1,5 - dihydroxynaphthalene, 2,2'-methylene bis (4 - methyl - 6-tert. butylphenol), 4,4' - methylene bis (2,6 - di - tert. butylphenol), 4,4' - butylidene bis (3-methyl-6-tert. butylphenol), 4,4' - thiobis (3 - methyl-6-tert. butylphenol), 2,2' - dihydroxy-3,3',5,5' - tetramethylstilbene, methylene bis ($\beta$ - naphthol), methylene bis salicylic acid, 2,2'-isopropylidene bis (4 - methyl-6-tert. butylphenol), N-salicoyl-p-aminophenol, and the like. A single phenol or a mixture of two or more of these compounds may be used.

The stabilizer compositions of this invention generally contain approximately 0.01 part to 0.1 part by weight of the phenolic compound, 0.5 part to 2 parts by weight of the phosphite component, and 0.1 part to 1 part by weight of the polyvalent metal benzoate component per part by weight of the barium salt complex. The preferred compositions contain 0.02 part to 0.08 part by weight of the phenolic compound, 0.7 part to 1 part by weight of the phosphite component, and 0.3 to 0.7 part by weight of the polyvalent metal benzoate component per part by weight of the barium salt complex.

The vinyl halide resins that may be present in the stabilized compositions of this invention are the resinous products obtained by the polymerization of a vinyl halide in the presence or absence of a copolymerizable monomer. The term "vinyl halide resin" as used herein includes vinyl halide homopolymers, such as polyvinyl chloride and polyvinyl bromide, as well as vinyl halide copolymers, including those formed by by the polymerization of a vinyl halide with comonomer such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those that contain at least 70% of vinyl halide units and up to 30% of the comonomer units. The invention is also applicable to mixtures of vinyl halide resins in a major proportion with a minor proportion of another synthetic resin, such as chlorinated polyethylene polyacrylate and polymethacrylate esters, and copolymers of acrylonitrile, butadiene, and styrene.

In addition to the vinyl halide resin and stabilizer, the compositions may also contain plasticizers, such as dioctyl phthalate, dibutyl sebacate, tricresyl phosphate, and octyl diphenyl phosphate, other heat and light stabilizers such as epoxidized oils and polyhydric alcohols, pigments, dyes, extenders, solvents, and other resin additives in the amounts ordinarily employed for the purpose indicated.

Only a small amount of the stabilizer need be present in the vinyl halide resin compositions of this invention. It has been found that as little as 1% of the stabilizer, based on the weight of the composition, will bring about an appreciable improvement in the heat and light stability of the composition. Approximately 10% or more of the stabilizer can be used, but these larger amounts generally do not provide further improvement in the properties of the resinous composition and for this reason are not ordinarily used. While the amount of the stabilizer that will provide optimum heat stability and resistance to plate-out depends upon such factors as the choice of stabilizer components and the choice of vinyl halide resin, in most cases approximately 2% to 6% of the stabilizer, based on the weight of the vinyl halide resin composition, is used,. This amount of stabilizer will provide approximately 0.7 part to 1.1 parts by weight of the barium salt, 0.2 part to 0.5 part by weight of the polyvalent metal benzoate component, 0.02 part to 0.08 part by weight of the phenol, and 0.6 part to 1 part by weight of phosphite per 100 parts by weight of the vinyl halide resin.

The stabilized vinyl halide resin compositions may be prepared by any suitable and convenient procedure. It is generally preferred to blend the stabilizer or the individual stabilizer components with the vinyl halide resin using plastic mixing rolls at a temperature at which the mixture is fluid and to mill the composition on a two-roll mill at from 300° F. to 400° F. for a time sufficient to form a homogeneous sheet. The plasticizer and other additives may be incorporated with the stabilizer. The stabilized composition may then be removed from the mill in the form of a sheet or film of the desired thickness which may be used as such or subjected to a polishing or embossing treatment.

The heat stability of these stabilized compositions and of compositions that contained other combinations of stabilizer components was determined by placing 1 x 1 inch specimens which had been cut from the milled sheets in a circulating air oven at either 350° F. or 390° F. and removing specimens periodically until degradation was complete as judged by color change. A color rating scale was adopted for purposes of comparison of color and consequently comparison of stabilizing efficiency. On this scale, a rating of 0 denotes absence of color; 2, faint yellow; 3, yellow; 4, dark yellow; 5, orange; and 7, black.

The tendency of the stabilizers to plate-out was measured by preparing by the aforedescribed milling procedure a composition which contained in addition to the vinyl halide resin, plasticizer, epoxidized oil, and stabilizer a red pigment that is known to plate out. After milling, the composition was removed from the mill. Then without an intervening cleaning of the mill rolls a white "clean-up" composition was run on the mill. The tendency of the composition to plate out was determined by the degree of coloration of the "clean-up" composition. A numerical scale was used to indicate the plate-out ratings of the composition. On this scale a rating of 1 denotes no plate-out; 2, light pink coloration; 3, pink coloration; 5, light red coloration; 7, red coloration; and 10, dark red coloration of the "clean-up" composition. For most commercial applications, it is preferred that the compositions have a plate-out rating of 1 to 3.

This invention is further illustrated by the Examples that follow. In these examples, all parts are parts by weight unless otherwise specified.

EXAMPLE 1

A mixture of 257 grams (3.36 equivalents) of barium oxide, 234 grams (0.81 equivalent) of oleic acid, 99 grams (0.76 equivalent) of octanol, 45 grams of water, and 300 grams of mineral oil was heated at a temperature of 135°–145° C. for 30 minutes. The mixture was then treated with carbon dioxide at the rate of 2 cubic feet per hour at 145° C. for about 2 hours. The reaction mixture was heated to 190° C. and filtered. The resulting substantially neutral liquid barium salt complex contained 20.5% of barium and 34.5% of sulfate ash and had a viscosity index of 125.

EXAMPLE 2

Stabilized polyvinyl chloride resin compositions were prepared by the following procedure:

To a mixture of 100 parts of polyvinyl chloride (Geon 101 EP), 45 parts of dioctyl phthalate, 5 parts of epoxidized soybean oil and 0.5 part of stearic acid was added a stabilizer or a mixture of stabilizer components. The resulting mixture was blended at room temperature and then charged to a two-roll, steam-heated differential speed mill whose roll surface temperature was maintained at 330° F. The mixture was milled for 5 minutes and then removed from the mill as a flexible, homogeneous sheet, 0.045 inch in thickness.

The plate-out characteristics of these stabilizers was determined by preparing compositions that contained in addition to the aforementioned ingredients 0.67 part of Permanent Red 2B pigment. The composition was milled for 5 minutes at 330° F. and then removed from the rolls. Without an intervening cleaning of the rolls, a 100 part portion of a "clean-up" composition was run on the mill. This composition was prepared from 100 parts of polyvinyl chloride (Geon 101 EP), 30 parts of dioctyl phthalate, 10 parts of calcium carbonate, 1 part of titanium dioxide (rutile), and 0.5 part of calcium stearate.

The stabilizer components used and the properties of the stabilized compositions are given in Table I.

TABLE I

| | Example Number | | | | |
|---|---|---|---|---|---|
| | 2A | 2B | 2C | 2D | 2E |
| Stabilizer components, parts: | | | | | |
| Product of Ex. No. 1 | 0.87 | 0.87 | | | |
| Barium 2-ethylhexoate | | | 0.56 | | |
| Barium benzoate | | | | 0.56 | |
| Barium p-tert. butylbenzoate | | | | | 0.65 |
| Cadmium benzoate | 0.35 | | 0.35 | 0.35 | 0.35 |
| Cadmium 2-ethylhexoate | | 0.39 | | | |
| Diphenyldecyl phosphite | 0.75 | | 0.75 | 0.75 | 0.75 |
| p-tert. butylcatechol | 0.03 | | | | |
| Clarity | (1) | (2) | (3) | (4) | (5) |
| Plate-out rating | 2 | 5 | 6 | 10 | 7 |
| Heat stability (Color after indicated number of minutes at 350° F.), minutes: | | | | | |
| 0 | 0 | 0 | 0 | 0 | 0 |
| 15 | 0 | 0 | 0 | 0 | 0 |
| 30 | 0 | 1 | 0 | 0 | 0 |
| 45 | 0 | 1 | 0 | 0 | 0 |
| 60 | 0 | 2 | 0 | 0 | 0 |
| 90 | 1 | 3 | 1 | 2 | 1 |
| 120 | 2 | 4 | 2 | 3 | 2 |
| 150 | 3 | 6 | 3 | 4 | 3 |

1 Clear.
2 Very slightly hazy.
3 Slightly hazy.
4 Very hazy.
5 Hazy.

EXAMPLE 3

Using the procedure described in Example 2, compositions were prepared from 100 parts of polyvinyl chloride (Geon 101 EP), 60 parts of dioctyl phthalate, 20 parts of epoxidized soybean oil, 0.5 part of stearic acid, and either one of the stabilizers of this invention or a comparative stabilizer that contained barium benzoate in place of the barium complex. The stabilizer components used and the properties of the stabilized compositions are given in Table II.

TABLE II

| | Example Number | |
|---|---|---|
| | 3A | 3B |
| Stabilizer components, parts: | | |
| Product of Example 1 | 0.95 | |
| Barium benzoate | | 0.6 |
| Cadmium benzoate | 0.21 | 0.21 |
| Zinc p-tert. butylbenzoate | 0.2 | 0.2 |
| Diphenyl decyl phosphite | 0.6 | 0.6 |
| Phenyl decyl phosphite | 0.3 | 0.3 |
| 2,6-di-tert.butyl-4-tert.amylphenol | 0.25 | |
| Clarity | (1) | (2) |
| Plate-out rating | 2 | 7 |
| Heat stability (Color after indicated number of minutes at 390° F.), minutes: | | |
| 0 | 0 | 0 |
| 15 | 0 | 0 |
| 30 | 1 | 1 |
| 45 | 1 | 1 |
| 60 | 2 | 2 |
| 75 | 2 | 2 |
| 90 | 2 | 2 |
| 105 | 3 | 3 |
| 120 | 4 | 4 |

1 Clear.
2 Very hazy.

EXAMPLE 4

Using the procedure described in Example 2, compositions were prepared from 100 parts of polyvinyl chloride (Geon 101 EP), 45 parts of dioctyl phthalate, 5 parts of epoxidized soybean oil, 0.5 part of stearic acid, 10 parts of calcium carbonate, and either one of the stabilizers of this invention or a comparative stabilizer that contained barium benzoate in place of the barium complex. The stabilizer components used and the properties of the stabilized compositions are given in Table III.

TABLE III

|  | Example Number | |
|---|---|---|
|  | 4A | 4B |
| Stabilizer components, parts: | | |
| Product of Example 1 | 0.91 | |
| Barium benzoate | | 0.58 |
| Cadmium benzoate | 0.21 | 0.21 |
| Zinc benzoate | 0.14 | 0.14 |
| Diphenyl decyl phosphite | 0.6 | 0.6 |
| Phenyl decyl phosphite | 0.3 | 0.3 |
| 4,4'-Thiobis-(6-tert. butyl-m-cresol) | 0.03 | |
| Plate-out rating | | |
| Heat stability (Color after indicated number of minutes at 350° F.), minutes: | | |
| 0 | 0 | 0 |
| 15 | 0 | 0 |
| 30 | 0 | 0 |
| 45 | 0 | 0 |
| 60 | 0 | 0 |
| 90 | 2 | 2 |
| 120 | 4 | 4 |
| 150 | 5 | 5 |

EXAMPLE 5

Using the procedure described in Example 2, compositions were prepared from 100 parts of vinyl chloride/vinyl acetate copolymer (Vinylite VYNW), 45 parts of dioctyl phthalate, 8 parts of 2-ethylhexyl epoxytallate, 0.5 part of stearic acid, and either one of the stabilizers of this invention or a comparative stabilizer that contained a different barium salt. The stabilizer components used and the properties of the stabilized compositions are given in Table IV.

TABLE IV

|  | Example Number | | | | |
|---|---|---|---|---|---|
|  | 5A | 5B | 5C | 5D | 5E |
| Stabilizer components, parts: | | | | | |
| Product of Ex. No. 1 | 0.8 | 0.8 | | | |
| Barium 2-ethylhexoate | | | 0.51 | | |
| Barium benzoate | | | | 0.45 | |
| Barium p-tert.butylbenzoate | | | | | 0.59 |
| Cadmium 2-ethylhexoate | | 0.38 | | | |
| Cadmium p-tert. butylbenzoate | 0.45 | | 0.45 | 0.45 | 0.45 |
| Diphenyl decyl phosphite | 0.6 | | 0.6 | 0.6 | 0.6 |
| Phenyl decyl phosphite | 0.1 | | 0.1 | 0.1 | 0.1 |
| 2,2'-methylene bis (4-ethyl-6-tert. butylphenol) | 0.06 | | | | |
| Clarity | (¹) | (²) | (³) | (⁴) | (⁵) |
| Plate-out rating | 2 | 5 | 6 | 8 | 10 |
| Heat stability (Color after indicated number of minutes at 350° F.), minutes: | | | | | |
| 0 | 0 | 0 | 0 | 0 | 0 |
| 15 | 0 | 0 | 0 | 0 | 0 |
| 30 | 0 | 1 | 0 | 0 | 0 |
| 45 | 0 | 1 | 0 | 0 | 0 |
| 60 | 0 | 2 | 0 | 0 | 0 |
| 90 | 1 | 3 | 1 | 1 | 1 |
| 120 | 3 | 4 | 3 | 3 | 3 |
| 150 | 4 | 5 | 4 | 4 | 4 |

¹ Clear.
² Very slightly hazy.
³ Slightly hazy
⁴ Hazy.
⁵ Very hazy.

From the data in Tables I–IV, it will be seen that the compositions that contain the stabilizers of this invention, that is, Ex. Nos. 2A, 3A, 4A, and 5A, are significantly better in plate-out resistance and clarity than those that contain a barium soap of an aliphatic or aromatic monocarboxylic acid in place of the barium complex whose preparation is described in Example 1. As compared with a composition that contains as stabilizer components only the barium complex of Example 1 and a cadmium salt of an aliphatic acid, the compositions of this invention are significantly better in plate-out resistance and heat stability (Ex. Nos. 2A vs. 2B and Ex. Nos. 5A vs. 5B).

Each of the other barium complexes disclosed herein may also be combined with the aforementioned cadmium and/or zinc salts of benzoic acid or hydrocarbon-substituted benzoic acid, alkyl aryl phosphites, and phenols in the specified amounts to form stabilizers that impart to vinyl halide resin compositions excellent heat stability, plate-out resistance, and clarity.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:
1. A plate-out resistant, heat and light stable resinous composition comprising a vinyl halide resin and from 1 part to 10 parts by weight per 100 parts by weight of said resinous composition of a stabilizer comprising
  (a) a liquid oil-soluble barium salt complex prepared by the process which comprises forming a reaction mixture comprising
    (i) an acidic compound selected from the group consisting of aliphatic monocarboxylic acids having from 10 to 18 carbon atoms and alkylated monophenols having from 1 to 4 alkyl groups each of which has from 3 to 18 carbon atoms;
    (ii) an aliphatic alcohol having from 1 to 12 carbon atoms; and
    (iii) a basic compound selected from the group consisting of barium oxide and barium hydroxide
   in the amounts of approximately 0.5 equivalent to 10 equivalents of said alcohol and 1.1 equivalents to 5 equivalents of said basic barium compound per equivalent of said acidic compound, and treating said mixture with carbon dioxide to reduce its basicity;
  (b) a polyvalent metal salt selected from the group consisting of cadmium and zinc salts of benzoic acid, alkylbenzoic acids, and halobenzoic acids;
  (c) an alkyl aryl phosphite; and
  (d) a phenolic compound in the amounts of approximately 0.1 part to 1 part by weight of the polyvalent metal salt component, 0.01 part to 0.1 part by weight of the phenolic compound, and 0.5 part to 2 parts by weight of the alkyl aryl phosphite component per part by weight of the barium salt complex.

2. A resinous composition as set forth in claim 1 that contains from 2 parts to 6 parts by weight of said stabilizer per 100 parts by weight of said resinous composition.

3. A resinous composition as set forth in claim 1 wherein the vinyl halide resin is polyvinyl chloride.

4. A resinous composition as set forth in claim 1 wherein the stabilizer contains 0.3 part to 0.7 part by weight of the polyvalent metal salt component, 0.02 part to 0.08 part by weight of the phenolic compound, and 0.7 part to 1 part by weight of the alkyl aryl phosphite component per part by weight of the barium salt complex.

5. A resinous composition as set forth in claim 1 wherein the polyvalent metal salt component of the stabilizer comprises cadmium benzoate.

6. A resinous composition as set forth in claim 1 wherein the alkyl aryl phosphite component of the stabilizer comprises diphenyl decyl phosphite.

7. A resinous composition as set forth in claim 1 wherein the alkyl aryl phosphite component of the stabilizer comprises phenyl decyl phosphite.

8. A resinous composition as set forth in claim 1 wherein the barium salt complex component of the stabilizer is the product obtained by passing carbon dioxide through a mixture comprising barium oxide, oleic acid, and octanol at a temperature in the range of 100° C. to 200° C. until the reaction mixture is substantially neutral.

9. A resinous composition as set forth in claim 1 wherein the phenolic component of the stabilizer is an alkylene bis (alkylphenol).

10. A stabilizer for vinyl halide resinous compositions that comprises
(a) a liquid oil-soluble barium salt complex prepared by the process which comprises forming a reaction mixture comprising
(i) an acidic compound selected from the group consisting of aliphatic monocarboxylic acids having from 10 to 18 carbon atoms and alkylated monophenols having from 1 to 4 alkyl groups each of which has from 3 to 18 carbon atoms;
(ii) an aliphatic alcohol having from 1 to 12 carbon atoms; and
(iii) a basic compound selected from the group consisting of barium oxide and barium hydroxide in the amounts of approximately 0.5 equivalent to 10 equivalents of said alcohol and 1.1 equivalents to 5 equivalents of said basic barium compound per equivalent of said acidic compound, and treating said mixture with carbon dioxide to reduce its basicity;
(b) a polyvalent metal salt selected from the group consisting of cadmium and zinc salts of benzoic acid, alkylbenzoic acids, and halobenzoic acids;
(c) an alkyl aryl phosphite; and
(d) a phenolic compound in the amounts of approximately 0.1 part to 1 part by weight of the polyvalent metal salt component, 0.01 part to 0.1 part by weight of the phenolic compound, and 0.5 part to 2 parts by weight of the alkyl aryl phosphite per part by weight of the barium salt complex.

11. A stabilizer as set forth in claim 10 that contains 0.3 part to 0.7 part by weight of the polyvalent metal salt component, 0.02 part to 0.08 part by weight of the phenolic compound, and 0.7 part to 1 part by weight of the alkyl aryl phosphite per part by weight of the barium salt complex.

12. A stabilizer as set forth in claim 10 wherein the polyvalent metal salt component is a mixture of cadmium and zinc salts.

13. A stabilizer as set forth in claim 10 wherein the polyvalent metal salt component comprises cadmium benzoate.

14. A stabilizer as set forth in claim 10 wherein the phosphite component is a mixture of secondary and tertiary alkyl aryl phosphites.

15. A stabilizer as set forth in claim 10 wherein the phosphite component comprises diphenyl decyl phosphite.

16. A stabilizer as set forth in claim 10 wherein the phosphite component comprises phenyl decyl phosphite.

17. A stabilizer as set forth in claim 10 wherein the barium salt complex is the product obtained by passing carbon dioxide through a mixture comprising barium oxide, oleic acid, and octanol until the reaction mixture is substantially neutral.

18. A stabilizer as set forth in claim 10 wherein the phenolic component of the stabilizer is an alkylene bis (alkylphenol).

19. A stabilizer as set forth in claim 10 wherein the phenolic component of the stabilizer is a thiobis (alkylphenol).

20. A stabilizer as set forth in claim 10 wherein the phenolic component is 2,2'-methylene bis (4-ethyl-6-tert. butylphenol).

References Cited
UNITED STATES PATENTS

| | | | |
|---|---|---|---|
| 2,625,521 | 1/1953 | Fischer et al. | 260—23 |
| 2,968,642 | 1/1961 | Le Suer | 260—45.75 |
| 2,997,454 | 8/1961 | Leistner et al. | 260—45.8 |
| 3,147,232 | 9/1964 | Norman et al. | 260—23 |
| 3,202,632 | 8/1965 | Lally et al. | 260—45.95 |
| 3,225,001 | 12/1965 | Darsa | 260—45.75 |
| 3,231,531 | 1/1966 | Buckley et al. | 260—23 |
| 3,274,135 | 9/1966 | Norman et al. | 260—23 |
| 3,287,299 | 11/1966 | Canarios | 260—23 |

DONALD E. CZAJA, Primary Examiner

R. A. WHITE, Assistant Examiner

U.S. Cl. X.R.

252—400, 404; 260—45.7, 45.75, 45.95